(12) United States Patent
Pollard et al.

(10) Patent No.: US 7,796,297 B2
(45) Date of Patent: Sep. 14, 2010

(54) IMAGE PROCESSING SYSTEM AND METHOD

(75) Inventors: Stephen Pollard, Dursley (GB); Andrew Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 11/754,164

(22) Filed: May 25, 2007

(65) Prior Publication Data

US 2007/0291332 A1 Dec. 20, 2007

(51) Int. Cl.
H04N 1/40 (2006.01)
(52) U.S. Cl. ............................. 358/1.9; 358/509
(58) Field of Classification Search ............ 358/1.9, 358/2.1, 504, 500, 509, 474–475
See application file for complete search history.

(56) References Cited

U.S. PATENT DOCUMENTS

2006/0209365 A1* 9/2006 Lee et al. .................... 358/486

2007/0097386 A1 5/2007 Tregoning

* cited by examiner

Primary Examiner—Thomas D Lee
Assistant Examiner—Stephen M Brinich

(57) ABSTRACT

An image processing system, comprising a scanning device having at least first and second light sources for illuminating an object to be scanned, the second light source configured to emit light at a different frequency spectrum than the first light source, a scanned image of the object generated using light emitted by the first and second light sources, the system further comprising a processor, wherein image data representing at least two images of the object respectively generated using light from the first and second light sources is processed by the processor in order to decompose the images into component data representing respective higher and lower spatial frequency components, and wherein component data relating to at least the lower spatial frequency components for the first and second images is transformed in order to generate transformed data for the low spatial frequency components, and method.

20 Claims, 4 Drawing Sheets

IMAGE PROCESSING SYSTEM AND METHOD

FIELD OF THE INVENTION

The present invention relates generally to image processing, and more specifically to improving the color accuracy of image data.

BACKGROUND

There are many applications that need optical scanners to convert objects, such as text and graphics objects on paper-based materials for example, to an electronic format that can be subsequently analyzed, distributed and archived. One of the most popular type of optical scanners is a flatbed scanner type device that converts objects, including pictures and papers, to image data that can be used, for example, for building Web pages and optical character recognition. The optical scanners are sometimes referred to as image scanners as the output thereof is generally in digital images.

FIG. 1 demonstrates a conventional flatbed scanner 100. Similar to a copy machine, flatbed scanner 100 includes a cover or lid 102 and a glass panel 103. Generally a scanning document 108 must be placed on glass panel 103 and faced down with lid 102 closed, so that an image sensing mechanism or imager in compartment 104 can properly scan scanning document 108.

Flatbed scanner 100 is suitable for many applications, however, the color accuracy of data generated by scanner 100 can be improved. One way to improve color accuracy is to increase the number of color channels. One way to do this has been disclosed in our co-pending U.S. patent application Ser. No. 11/263,482 entitled "Image Optimization System and Method" filed 31 Oct. 2005, the disclosure of which is incorporated herein by reference. Ser. No. 11/263,482 uses a monochrome CIS sensor and a plurality of narrow band LED sensors. This type of scanner is a vast improvement, but does not give the highest image quality possible.

LED's can be expensive and do not produce much light. Consequently scan speed tends to be slow. Hence it is advantageous to develop a higher quality scanner that is operable to provide improved color accuracy. Generally, this type of scanner uses multiple rows of filtered sensors that are usually red, green and blue. However, additional useful channels cannot be created by simply increasing the number of filtered rows of sensors as the spectral properties of the light source tend to limit color accuracy. The alternative, as disclosed in Ser. No. 11/263,482, is to use a second light source with different spectral properties. Then two scans can be used to provide the additional spectral information required to give improved color accuracy. Registration difficulties and noise amplification can cause problems when using two scans.

SUMMARY OF THE PRESENT INVENTION

According to a first aspect of the present invention there is provided an image processing system, comprising a scanning device having at least first and second light sources for illuminating an object to be scanned, the second light source configured to emit light at a different frequency spectrum than the first light source, a scanned image of the object generated using light emitted by the first and second light sources, the system further comprising a processor, wherein image data representing at least two images of the object respectively generated using light from the first and second light sources is processed by the processor in order to decompose the images into component data representing respective higher and lower spatial frequency components, and wherein component data relating to at least the lower spatial frequency components for the first and second images is transformed in order to generate transformed data for the low spatial frequency components.

According to a second aspect of the present invention there is provided a method for generating an image of a portion of an object, the method comprising generating first and second image data representing respective first and second images of the portion, the first and second images composed of a plurality of respective different color channels, using the first and second image data, decomposing the first and second images in order to generate at least lower spatial frequency components for the images, transforming at least the lower spatial frequency components in order to generate transformed data for the images, and generating, using the transformed data, output image data representing an image of the portion.

According to a third aspect of the present invention there is provided an imaging system for imaging a portion of an object, the system comprising a support surface for supporting the portion to be imaged, at least a pair of light sources having respective different spectral illumination profiles and arranged to project respective beams of light so as to form at least two stripes of light across the document portion to be imaged, and an image capture device having a detector for generating, using light from respective ones of the projected beams, image data representative of at least two images of the portion, the system further comprising a processor operable to use the image data in order decompose the images into component data representing higher and lower spatial frequency components, and to transform at least a portion of the component data, and to use the transformed data to generate an output image of the portion.

According to a fourth aspect of the present invention there is provided a flatbed scanner operable in accordance with the method as claimed in any of claims 4 to 15.

According to a fifth aspect of the present invention there is provided a logic circuit configured to operate in accordance with the method as claimed in any of claims 4 to 15.

BRIEF DESCRIPTION OF THE DRAWINGS

For a better understanding of the present invention, and to further highlight the ways in which it may be brought into effect, embodiments will now be described, by way of example only, with reference to the following drawings in which:—

It should be emphasized that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
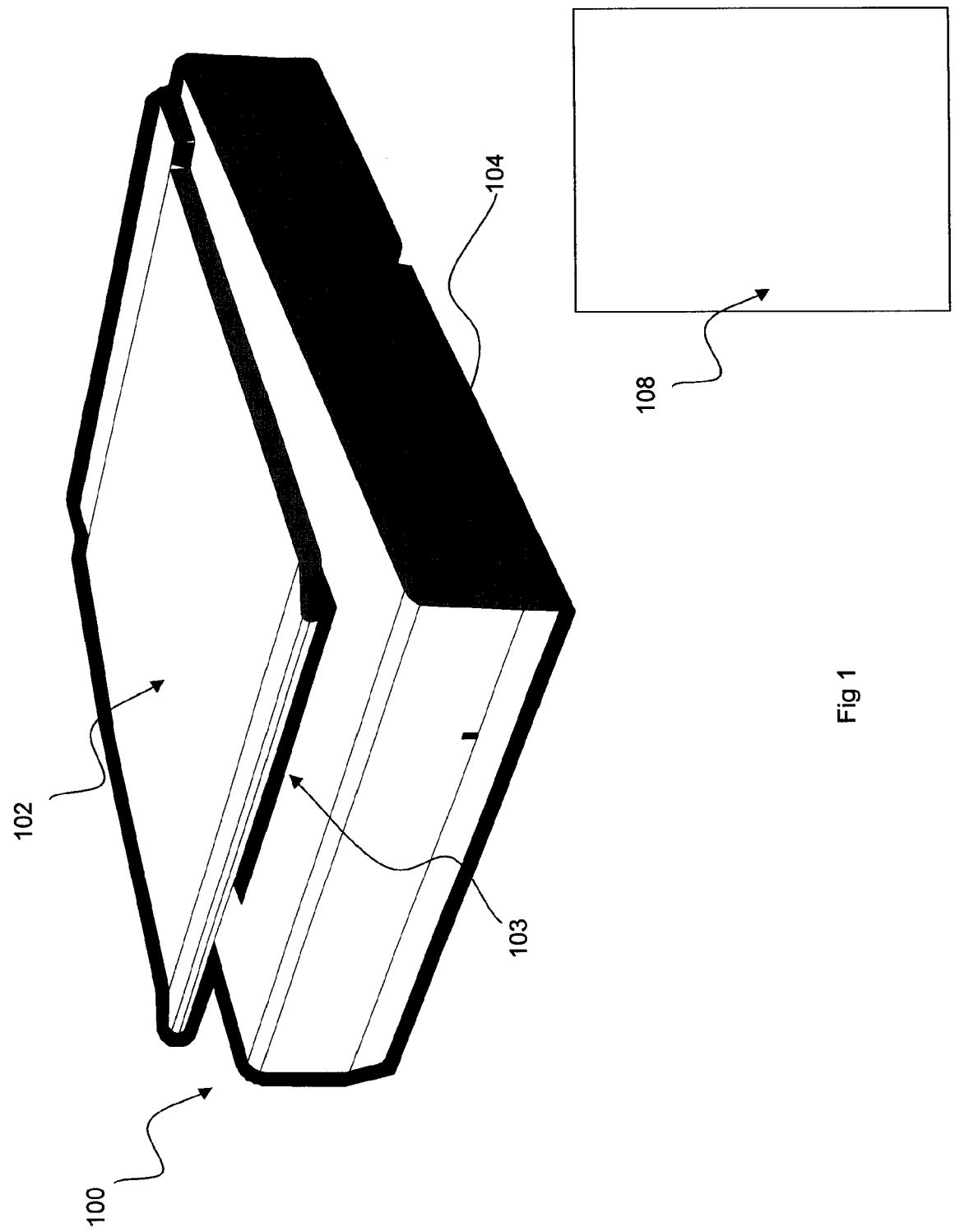
FIG. 1 is a schematic representation of a known flatbed scanner apparatus.
Figure 2:
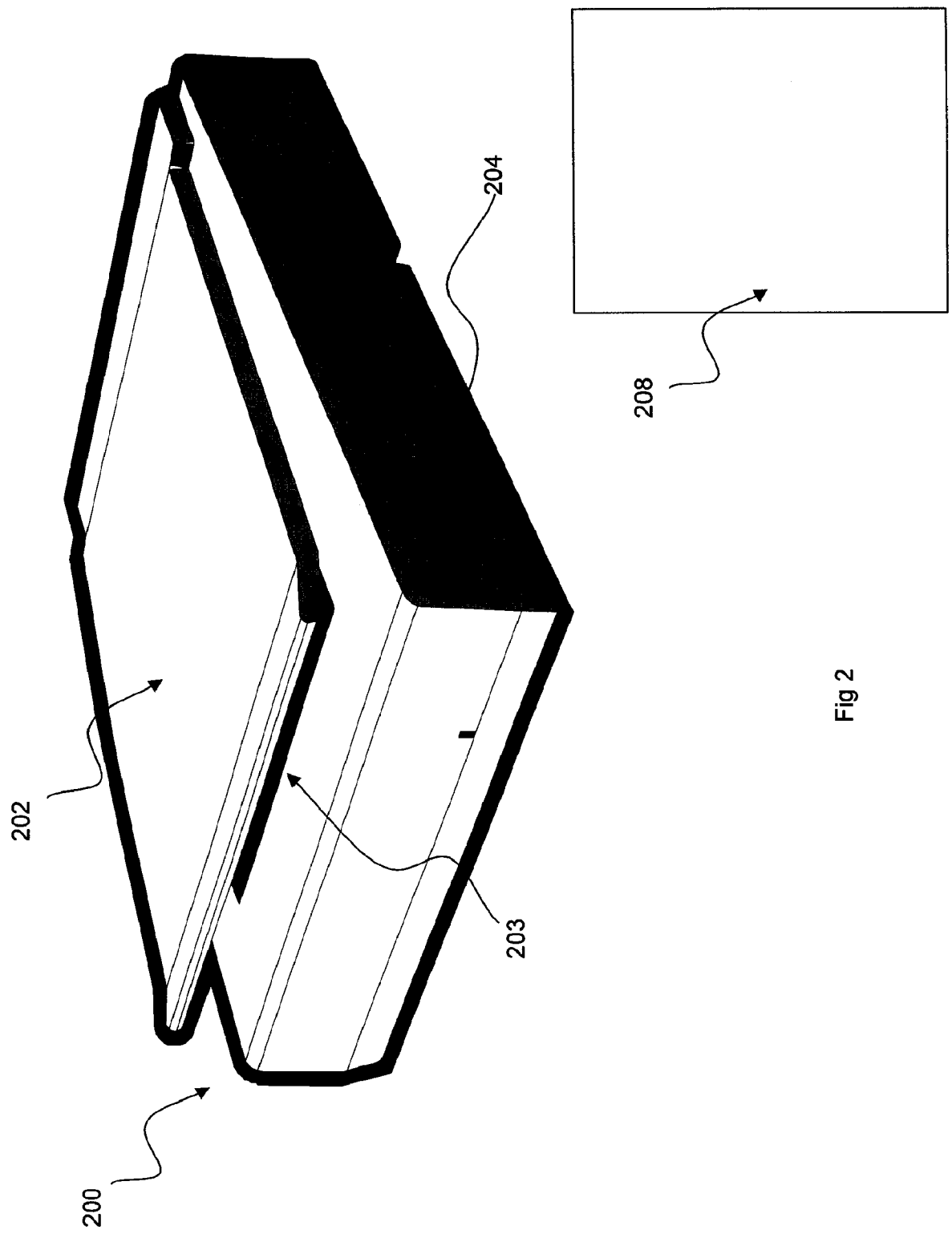
FIG. 2 is a schematic representation of a flat bed scanner according to an embodiment.

FIG. 2 is a schematic representation of a flat bed scanner 200 according to an embodiment. Scanner 200 can comprise a cover or lid 202 and a glass panel 203 for supporting material to be scanned. A document 208 to be scanned is placed on glass panel 203 and faced down, preferably with lid 202 closed, so that an imager (not shown) in compartment 204 can scan document 208. An imager of scanner 200 generally comprises a light source, or similar illumination device, arranged to illuminate material to be scanned. Light reflected from the material surface is detected using appropriate optics and three linear CCDs for example with red, green and blue color filters, and converted into image data representing a portion of the material. Alternatively, CMOS image sensors can be used. The imager is scanned across the material surface using conventional mechanical means (for example) in order to build up an image of the material surface. Alternatively, scanner 200 can scan a document, or portion thereof, by detecting light transmitted through the document or portion.

According to an embodiment, scanner 200 comprises two scanning light sources arranged to illuminate a surface of an object or material placed on panel 203. The light sources can form part of a single imaging mechanism in which both light sources are translated across a material surface in unison. Advantageously each light source has a different spectral illumination profile, that is, when the intensity of a light source is measured for each wavelength of the light produced by that light source, a different distribution results for each light source. Cold cathode fluorescent light sources (CCFLs) can be used in scanner 200 to illuminate a material to be scanned. CCFLs generate substantially no infra red, and consequently, radiation in this portion of the spectrum does not have to be filtered before it reaches the CCD.

Figure 3:
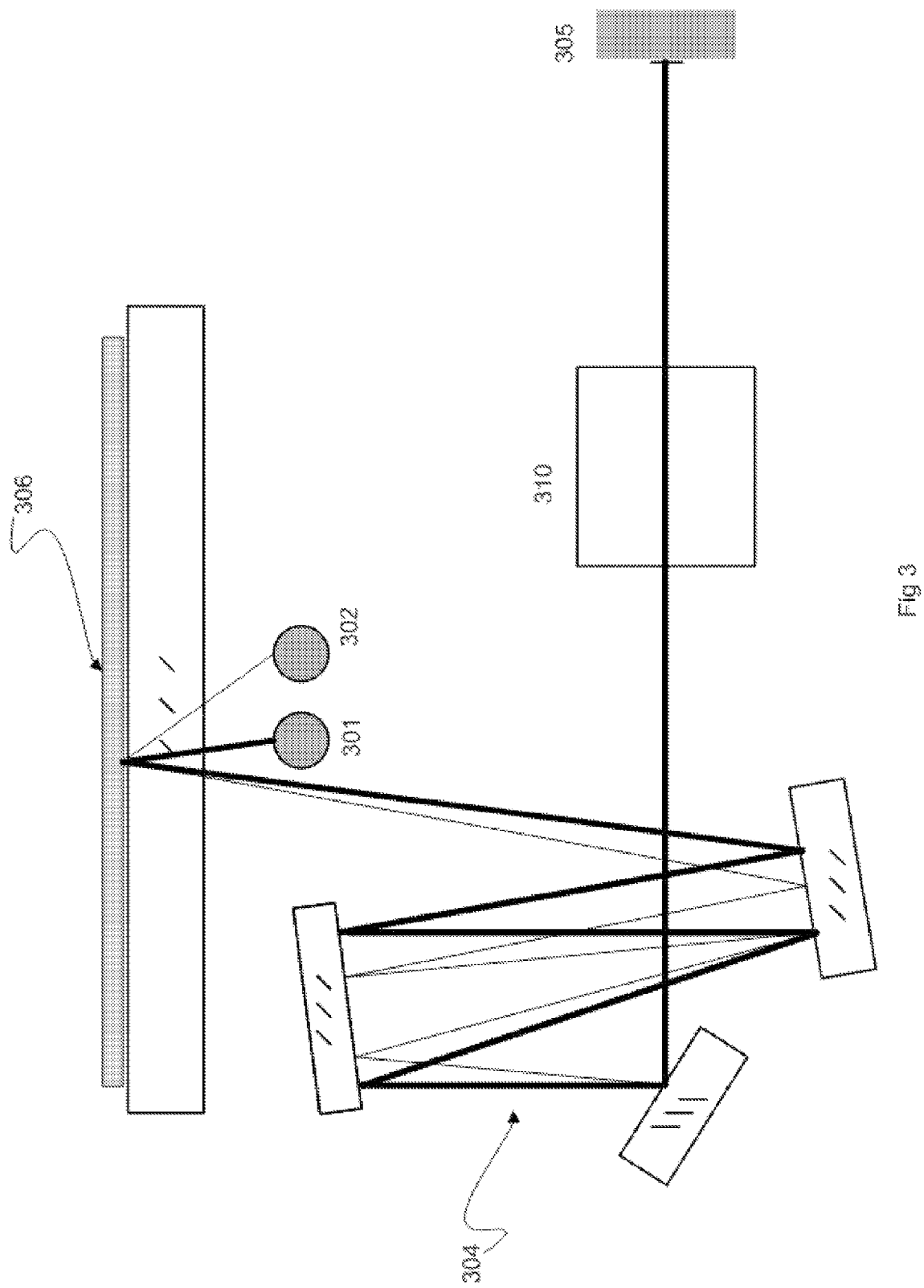
FIG. 3 is a schematic representation of an internal portion of the scanner of FIG. 2 in which multiple light sources are depicted.

FIG. 3 is a schematic representation of a portion of scanner 200 in which light sources 301, 302 are depicted. Light sources 301, 302 are connected to a common drive train (not shown), along with the folded optics 304 and three rows of RGB CCD elements 305. Both light sources can be translated across a material to be scanned (306) together. Light sources 301, 302 are displaced from one another by a small distance and can extend across the width of scanner 200 or a portion thereof. For example, light sources can extend across the panel 203 in order to ensure that all material placed on panel 203 can be sufficiently illuminated. Material to be scanned is separately scanned at least twice by scanning light sources 301, 302 across the document. One, other or both light sources are selected (illuminated) during a scan. The scans can occur at different times and/or speeds. According to an embodiment, a portion of a material to be scanned is firstly illuminated with one light source (301) and then the other (302). Image data representing an image of the portion is then generated using light reflected from or transmitted through the portion (depending on the desired nature of the scanner). The data is generated using the CCDs 305 (or similar image elements such as CMOS elements for example, or an area image sensor) which are operable to generated image data using light incident upon them. Light can be passed through a lens 310, for example, before it reaches the CCD elements. The image data comprises at least six color channels of information (e.g. RGB image data resulting from illumination with light source 301 and R'G'B' image data resulting from illumination with light source 302). Compared with the normal three channels of image data present from a conventional scan using a single light source, the six channels comprise additional color information which can be used to improve the accuracy of resultant scan data. The light sources 301, 302 are each configured to have different spectral response frequency characteristics to produce enhanced color information in the scanned image of the object. It should be understood that embodiments of the present invention may be used in both reflective and transmissive scanning applications.

It is generally necessary to transform the image data generated by a scanner to a standard trichromatic (three channel) color space based upon the CIE calorimetric observer (see for example H. J. Trussell (1991) Applications of set theoretic methods to color systems, Color Research Applications, Vol 16). For example, sRGB uses the color space defined by the CIE color matching functions for the primaries specified in ITU-R BT.709 (the HDTV Standard for the Studio and for International Programme Exchange). Given that the response curves of the individual channels of the capture device are substantially linear (or suitable calibration can used to make them substantially linear) then the transformation to the calorimetric space will be linear and can be approximated using an n×3 matrix (where n is the number of color channels in the scanner):

$$\begin{bmatrix} R \\ G \\ B \end{bmatrix} = \begin{bmatrix} m_{11} & m_{12} & \cdot & m_{1n} \\ m_{21} & m_{22} & \cdot & m_{2n} \\ m_{31} & m_{32} & \cdot & m_{3n} \end{bmatrix} \begin{bmatrix} c_1 \\ c_2 \\ \cdot \\ c_n \end{bmatrix}$$

The $c_n$ represent the color channels in the color space of the scanning device. M is the transformation matrix comprising transform elements $m_{3n}$.

Depending upon the detailed spectral properties of the capture device, this transformation results in substantially the correct calorimetric representation of the scanned material. In general increasing the number of color channels in the scanning device improves the color accuracy of the transformation.

As well as mapping to a standard color space, the color transform also affects the degree of noise amplification in the resulting image. Assuming statistical independence and uniformity across the channels, the noise amplification of a linear filter is given by the root of the sum of the squares of the filter elements. Consequently, amplification of noise, a, in the three calorimetric output channels is given by:

$$\begin{bmatrix} a_1 \\ a_2 \\ a_3 \end{bmatrix} = \begin{bmatrix} \left(\sum m_{1i}^2\right)^{0.5} \\ \left(\sum m_{2i}^2\right)^{0.5} \\ \left(\sum m_{3i}^2\right)^{0.5} \end{bmatrix}$$

In reality while the noise is generally an independent component in the image data its magnitude can vary between channels due to variations in photon shot noise with intensity and different amounts of gain that may have been applied to each channel. However, in practice this approximation remains a useful metric.

According to an embodiment, the six color channels of data generated by the two light sources 301, 302 are decomposed into respective higher and lower spatial frequency components. For example, for each channel a low pass filter can be applied to the data for the channel (such as a Gaussian spatial filter for example). This results in data in which the higher spatial frequency image components have been filtered out. This can be repeated for each channel, and the result subtracted from the original data to recover the complementary high frequency component for a channel. The combination of the lower and higher frequency channel components will result in the original image for each channel.

A 3×6 color transform is applied to the lower frequency components. This transform does not significantly amplify noise with respect to the original component if the noise reduction resulting from the low pass filter is sufficient. This is because, in general, visible noise is carried in the higher spatial frequency components of an image, and therefore the application of the transform to a lower frequency component, i.e. a component in which these noise elements have been greatly reduced, will not substantially amplify noise with respect to the original, if at all.

In one embodiment, a 3×6 color transform is applied to the higher frequency components. This transform can be chosen to suppress noise since the image details will have high correlation for the different illuminants, while the image noise will be uncorrelated for the different illuminants. Alternatively in another embodiment, and advantageously when there may be some relative misalignment of the images from the two illuminants, a 3×3 color transform is applied only to the 3 high frequency channels corresponding to a single scan. This scan is chosen as the one that gives the best overall color accuracy and/or noise performance. This is in turn dependent on which of the individual light sources gives the best color accuracy and/or noise performance. It is often possible that one scan can be performed with lower fidelity, for example with lower resolution or with worse noise performance, as only the low spatial frequencies are needed for the 3×6 color transform—in this case it is clear that the other scan provides the high frequency information. Another possibility is that one scan has both light sources on and the other is the absence of one or other light sources—it is clear then that the high frequency should come from the 'both light source on' condition and that the choice is now which light source to turn off for the second scan.

The 3×6 and 3×3 transforms are chosen to map the data from the channels to the same target color space. The 3×6 transform gives better color accuracy because it has more color information (6 channels not 3), however it may also amplify noise in order to get the improved color accuracy. In order to avoid this, a 3×6 transformation need only be applied to the low frequency components, which have lower noise (as explained above). The higher frequencies (derived from only 3 channels of a single scan) have a 3×3 transformation applied to them. Since color errors in the high frequencies cannot generally be seen, this does not matter in practice. The 3×3 transform is chosen so as not to amplify noise greatly. The lower accuracy of colors in the higher frequency components will not affect overall quality since the high frequencies only influence a small spatial extent and are largely achromatic.

The resulting (transformed) 3 low frequency channels and 3 high frequency channels are combined to form the resultant target image. Advantageously, the resultant image will be substantially free from noise amplification and because the high frequency component comes from a single scan, it will also be substantially (or completely in some cases) free from other artifacts such as ghosting and blurring.

Furthermore because one scan only contributes low frequency components it is possible to perform that scan with lower fidelity, for example with lower resolution, than the other provided that a substantially equivalent low frequency component can be generated from each scan. Additionally, a lower resolution scan can be performed first and then the conversion from 6 to 3 channels performed on the fly as the second higher resolution scan is performed (with consequent advantage in terms of memory storage requirements for example).

Figure 4:
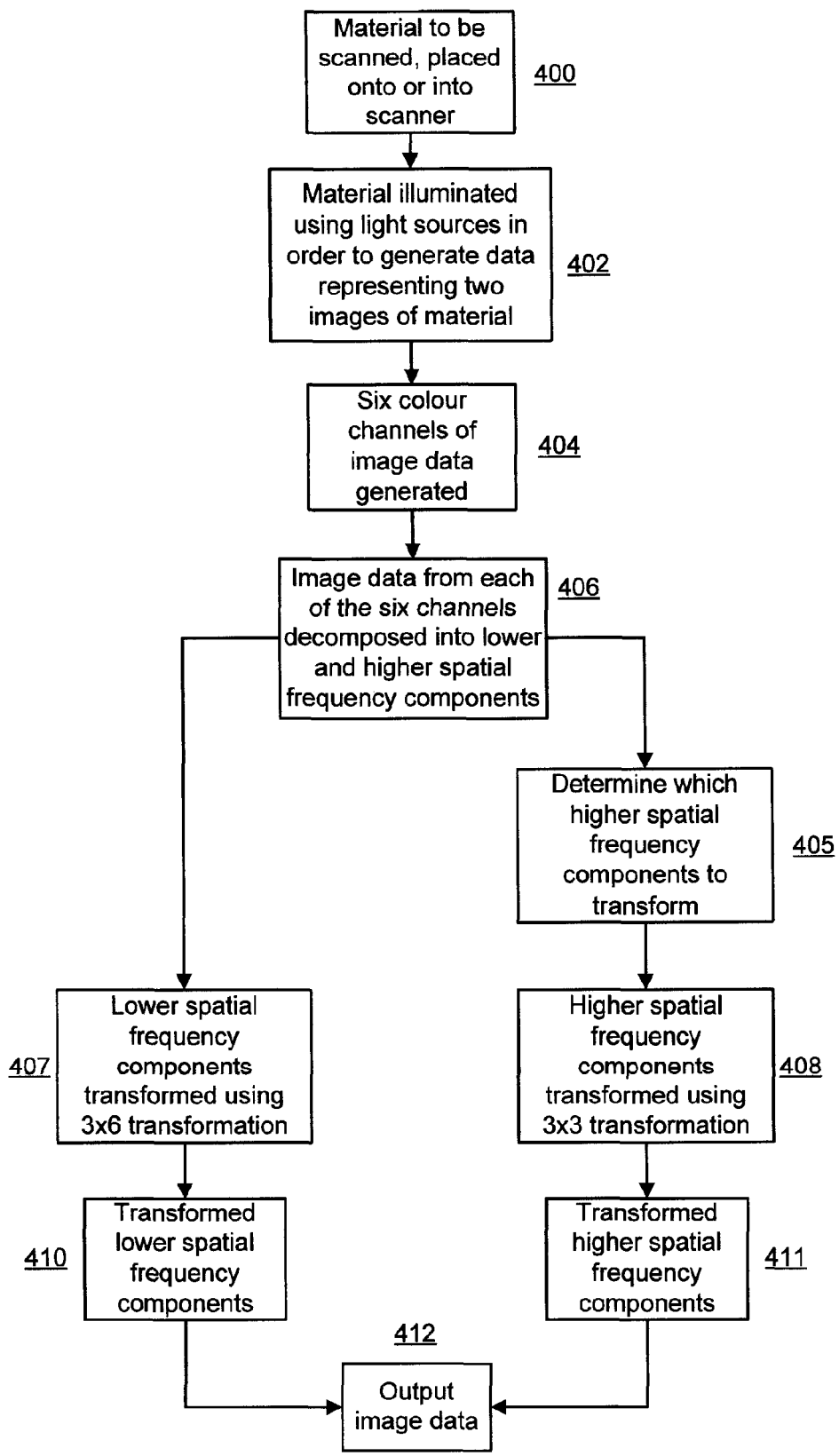
FIG. 4 is a flow diagram representing a process to generate a final image from two scans.

FIG. 4 is a flow diagram representing a process to generate a final image from two scans.

Material to be scanned, such as a page or portion of a document for example, is placed onto or into the scanner (for example, in the event that anything other than horizontal loading is permitted) at step 400. At step 402 the material is illuminated using light sources 301, 302 of FIG. 3 in order to generate data representing two images of the scanned material. The portion can be illuminated by the light sources at the same time (in which case there will need to be suitable spacing/arrangement of the light sources and detectors etc in order to ensure that data generated as a result of illumination from one of the light sources does not interfere with that of the other, or use of a suitable baffle for example), or at different times. Hence, at step 404 there is generated six color channels of image data, three from each of the two light sources, which image data represents an image of the portion in a color space. The image data from each light source can be in the RGB domain for example. Other alternatives are possible.

At 406, the image data from each of the six channels is decomposed into lower and higher spatial frequency components. The lower spatial frequency components are transformed in step 407 using a 3×6 transformation, whilst at step 408, three of the 6 higher spatial frequency components are transformed using a 3×3 transformation matrix, or equivalent. The step of determining which of the higher spatial frequency components to transform is determined at step 405, and, according to an embodiment, is predetermined as the components generated from either the better light source (from a color accuracy point of view) and/or the scan at a higher fidelity. In other embodiments the choice of which of the higher spatial frequency components to use could be dependent upon the image content for example.

Applying the 3×6 transform to the low frequency components at step 407 results in the generation of data representing transformed lower spatial frequency components (410). The transformation of the three higher spatial frequency components results in the generation of data representing transformed high frequency components (411).

At 412, the transformed components 410 and 411 are combined in order to generate output image data representing a target image of the portion.

It will be appreciated by those skilled in the art that light sources 301, 302 can be translated across the surface of material, such as a document, to be scanned at different speeds and/or different times, and to that end, scanner 200 can be provided with separate drive trains for each light source. It will further be appreciated that other scanning paradigms are to be understood as encompassed by the present disclosure. For example, although reference has been made to a light source or sources moving over the surface of a portion of a material to be scanned, it is possible that the light sources are stationary, and the material is translated over the light sources. Only relative movement between the light sources and the material is required, and the above description with reference to the light sources moving is not intended to be limiting.

According to an embodiment, higher spatial frequency image data for a particular color channel can be obtained from two or more scans. For example, a portion to be scanned can be illuminated with different light sources and higher spatial frequency image data for a color channel from the scans can be combined in order to generate single higher frequency component for the channel. In order for the data to be satisfactorily combined, accurate registration of the image data from the scans is required. The combination of data from two scans in order to form a higher spatial frequency component has the advantage that there will be reduced noise in the resultant higher frequency component.

It will be appreciated that the two (or more) light sources from scanner 200 can be replaced with a single light source adapted to provide two different illumination spectra. The single source can be used to illuminate a portion to be scanned, and can provide data corresponding to different regions of the spectrum for the portion. For example, light from the single source which is transmitted through or reflected from the portion can be filtered using appropriate filters such as color filters in the path or paths of light from the source for example (or other physical filters designed to allow only certain wavelengths of light to pass through them, or alternatively mathematical filters, i.e. post processing of generated data), and the resultant filtered image data can be used to provide a plurality of color channels of data, such as RGB and R'G'B' (as above), for example. The data representing the color channels can be processed as explained above in order to generate higher and lower spatial frequency components which can then be processed (transformed) as appropriate in order to generate output image data representing an image of the portion to be scanned.

It will also be appreciated that it is possible to replace the scanning mechanism altogether and use an area sensor in conjunction with a full field illumination source that illuminates the whole of the document.

The invention claimed is:

1. An image processing system, comprising:
a scanning device having at least first and second light sources for illuminating an object to be scanned, the second light source configured to emit light at a different frequency spectrum than the first light source, a scanned image of the object generated using light emitted by the first and second light sources, the system further comprising a processor, wherein image data representing at least two images of the object respectively generated using light from the first and second light sources is processed by the processor in order to decompose the images into component data representing respective higher and lower spatial frequency components, and wherein component data relating to at least the lower spatial frequency components for the first and second images is transformed in order to generate transformed data for the lower spatial frequency components.

2. The system as claimed in claim 1, wherein three of six of the higher spatial frequency components are transformed using a 3×3 transformation matrix.

3. The system as claimed in claim 1, wherein the transformed data for the lower spatial frequency components generates output image data representing the scanned image.

4. A method for generating an image of a portion of an object to be scanned, the method comprising:
generating first image data representing first images of the portion with a first light source;
generating second image data representing second images of the portion with a second light source, the first and second lights sources having different spectral illumination profiles;
decomposing the first and second image data into higher spatial frequency components and lower spatial frequency components;
transforming the lower spatial frequency components to generate transformed data for the images; and
generating, using the transformed data, output image data representing an image of the portion.

5. The method as claimed in claim 4, wherein the first image data includes first red, green, blue (RGB) data from the first light source, and the second image data includes second RGB data from the second light source.

6. The method as claimed in claim 4 further comprising:
applying a 3×3 transformation matrix to the higher spatial frequency components;
applying a 3×6 transformation matrix to the lower spatial frequency components.

7. The method as claimed in claim 4, wherein the transforming the lower spatial frequency components further comprises:
transforming, using a 3×6 transformation matrix, the lower spatial frequency components in order to generate transformed lower spatial frequency components;
selecting, from higher spatial frequency components from the first and second images, three higher spatial frequency components from respectively different colour channels from one of the first and second images; and
transforming the selected three higher spatial frequency components using a 3×3 transformation matrix in order to generate transformed higher spatial frequency components.

8. The method as claimed in claim 7, wherein generating the output image data comprises:
combining, in a predetermined manner, the transformed higher and lower spatial frequency components of the first and second images.

9. The method as claimed in claim 4, wherein decomposing the first and second image data into the lower spatial frequency components comprises:
filtering the image data of the first and second images using a smoothing filter in order to generate filtered data for respective ones of the channels of the images; and
subtracting the image data for respective ones of the channels of the first and second images from the corresponding filtered image data for the channels in order to generate higher spatial frequency components.

10. The method as claimed in claim 4 wherein one of the first and second images is of a lower resolution and/or is captured with a lower exposure than the other of the images.

11. The method as claimed in claim 4 further comprising, combining three transformed low frequency channels and three transformed high frequency channels to form the portion of the object.

12. The method as claimed in claim 11, wherein the first and second light sources generate six colour channels of image data that are decomposed into the higher spatial frequency components and the lower spatial frequency components.

13. The method as claimed in claim 4 further comprising, transforming six channels of the lower spatial frequency components and only three channels of six channels of the higher spatial frequency components.

14. The method as claimed in claim 4, further comprising:
receiving light transmitted through or reflected from the portion on at least one of a linear and an area sensor.

15. The method as claimed in claim 4, wherein a flatbed scanner generates the image of the portion.

16. An imaging system for imaging a portion of an object, the system comprising:
a support surface for supporting the portion to be imaged;
at least a pair of light sources having respective different spectral illumination profiles and arranged to project respective beams of light so as to form at least two stripes of light across the portion of the object to be imaged;
an image capture device having a detector for generating, using light from respective ones of the projected beams, image data representative of at least two images of the portion; and a processor that decomposes the images into component data representing higher and lower spatial frequency components and transforms at least a portion of the component data to generate an output image of the portion.

17. The imaging system as claimed in claim 16, wherein each of the images is composed from a respective different plurality of colour channels, the colour channels of an image relating to the spectral illumination profiles of the light sources.

18. The imaging system as claimed in claim 16, wherein the light sources are operatively coupled to at least one drive system or carriage for causing relative movement between the light sources and the portion of the object to be imaged.

19. The imaging system as claimed in claim 18, wherein the at least one drive system is operable to cause respective ones of the light sources and the portion of the object to be imaged to move relative to one another at different speeds.

20. The imaging system as claimed in claim 16, wherein one of said images has a lower fidelity compared to at least one other of the said images.

* * * * *